(12) United States Patent
Heines et al.

(10) Patent No.: US 12,389,891 B2
(45) Date of Patent: *Aug. 19, 2025

(54) ARTIFICIAL BAIT

(71) Applicants: Gary Heines, Mound, MN (US); Brett Herdendorf, Mound, MN (US); Riyan Mendonsa, Edina, MN (US)

(72) Inventors: Gary Heines, Mound, MN (US); Brett Herdendorf, Mound, MN (US); Riyan Mendonsa, Edina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,703

(22) Filed: Sep. 18, 2023

(65) Prior Publication Data

US 2024/0000055 A1 Jan. 4, 2024

Related U.S. Application Data

(63) Continuation-in-part of application No. 16/441,739, filed on Jun. 14, 2019, now Pat. No. 11,758,889.

(60) Provisional application No. 62/685,477, filed on Jun. 15, 2018.

(51) Int. Cl.
*A01K 85/00* (2006.01)

(52) U.S. Cl.
CPC ................... *A01K 85/1893* (2022.02)

(58) Field of Classification Search
CPC .................................................. A01K 85/01
USPC ............................................. 43/42.24, 26.2
See application file for complete search history.

(56) References Cited

U.S. PATENT DOCUMENTS

| | | | | |
|---|---|---|---|---|
| 1,906,791 A | * | 5/1933 | Grossman | A01K 85/16 43/17.1 |
| 2,079,883 A | * | 5/1937 | Valasek | A01K 85/16 43/42.42 |
| 4,914,851 A | * | 4/1990 | Acker | A01K 85/02 43/42.1 |
| 5,105,573 A | * | 4/1992 | Mays | A01K 85/16 43/17.1 |
| 5,203,103 A | * | 4/1993 | Hawley | A01K 85/00 43/17.1 |
| 5,694,714 A | * | 12/1997 | Basso | A01K 85/16 43/42.27 |
| 5,924,236 A | * | 7/1999 | Preston | A01K 85/16 43/42.31 |
| 5,970,647 A | * | 10/1999 | Watkins | A01K 85/08 43/42.31 |
| 6,006,466 A | * | 12/1999 | Washecka | A01K 91/14 43/43.11 |
| 6,058,644 A | * | 5/2000 | Irwin | A01K 85/16 43/42.27 |
| H1865 H | * | 10/2000 | Aoki | 43/42.19 |

(Continued)

FOREIGN PATENT DOCUMENTS

| | | | |
|---|---|---|---|
| DE | 102017123547 B3 | * | 2/2019 |
| JP | 2016525891 A | * | 11/2015 |

(Continued)

*Primary Examiner* — Christopher P Ellis
(74) *Attorney, Agent, or Firm* — Vidas, Arrett & Steinkraus, P.A.; Richard A. Arrett; Edwin E. Voigt

(57) ABSTRACT

An artificial bait having a housing which includes a power source, an electric motor, a controller, a coil, a magnet connected to a movable portion of the housing and a hook, wherein the controller alternates a current produced by the electric motor to cause the movable portion of the housing to move back and forth.

21 Claims, 12 Drawing Sheets

(56) References Cited

U.S. PATENT DOCUMENTS

| | | | | |
|---|---|---|---|---|
| 6,393,758 B1* | 5/2002 | Sparkman | A01K 85/08 | 43/42.25 |
| 6,925,747 B1* | 8/2005 | Swanson | A01K 85/16 | 43/17.1 |
| 7,234,267 B1* | 6/2007 | Konstant | A01K 85/02 | 43/42.24 |
| 8,621,776 B2* | 1/2014 | Thomas | A01K 85/00 | 43/42.31 |
| 8,950,105 B2* | 2/2015 | Thomas | A01K 85/01 | 43/42.31 |
| 11,758,889 B2* | 9/2023 | Heines | A01K 85/01 | 43/26.2 |
| 2004/0025406 A1* | 2/2004 | Kato | A01K 85/16 | 43/42.24 |
| 2004/0123510 A1* | 7/2004 | Essad | A01K 85/00 | 43/42.13 |
| 2006/0000137 A1* | 1/2006 | Valdivia y Alvarado | A01K 85/18 | 43/42.2 |
| 2006/0016118 A1* | 1/2006 | Zuk | A01K 85/18 | 43/43.12 |
| 2007/0033857 A1* | 2/2007 | Myers | A01K 93/00 | 43/41 |
| 2007/0089352 A1* | 4/2007 | Hergott | A01K 85/02 | 43/42.11 |
| 2007/0193106 A1* | 8/2007 | Gregory | A01K 85/00 | 43/42.39 |
| 2007/0294934 A1* | 12/2007 | Myers | A01K 93/00 | 43/41 |
| 2008/0202016 A1* | 8/2008 | Robertson | A01K 85/08 | 43/42.35 |
| 2008/0289243 A1* | 11/2008 | Huddleston | A01K 85/00 | 43/42.4 |
| 2009/0056196 A1* | 3/2009 | Korteweg | A01K 85/01 | 43/42.24 |
| 2010/0236130 A1* | 9/2010 | Basso | A01K 85/01 | 43/42.31 |
| 2011/0131863 A1* | 6/2011 | Parcell | A01K 99/00 | 43/41.2 |
| 2011/0252689 A1* | 10/2011 | Abraham | A01K 85/01 | 43/26.2 |
| 2012/0180372 A1* | 7/2012 | Kennedy | A01K 85/00 | 43/4.5 |
| 2014/0000149 A1* | 1/2014 | Signitzer | A01K 85/16 | 43/42.02 |
| 2015/0250153 A1* | 9/2015 | Storm | A01K 85/16 | 43/42.31 |
| 2017/0280693 A1* | 10/2017 | Lehl | A01K 97/00 | |
| 2019/0313616 A1* | 10/2019 | Aguilar | A01K 85/01 | |
| 2019/0343102 A1* | 11/2019 | Choi | A01K 85/10 | |
| 2020/0060250 A1* | 2/2020 | Russell | A01K 91/065 | |
| 2020/0352148 A1* | 11/2020 | Mancini | A01K 85/01 | |
| 2021/0037800 A1* | 2/2021 | Plihal | A01K 85/18 | |
| 2021/0076650 A1* | 3/2021 | Bingham | A01K 85/18 | |
| 2022/0061281 A1* | 3/2022 | Trammell | A01K 85/01 | |
| 2022/0256824 A1* | 8/2022 | Parks | A01K 83/06 | |
| 2022/0264856 A1* | 8/2022 | Malooley | A01K 83/06 | |
| 2022/0304293 A1* | 9/2022 | Reed | A01K 85/10 | |
| 2023/0049724 A1* | 2/2023 | Fox | A01K 91/04 | |

FOREIGN PATENT DOCUMENTS

| | | |
|---|---|---|
| JP | 2022175034 A * | 11/2022 |
| WO | WO-2014194397 A1 * | 12/2014 ............ A01K 85/00 |

* cited by examiner

ARTIFICIAL BAIT

CROSS-REFERENCE TO RELATED APPLICATIONS

This application is a Continuation-in-part of application Ser. No. 16/441,739, filed Jun. 14, 2019, which claims priority to provisional patent application No. 62/685,477, which was filed Jun. 15, 2018, and the entire contents of each of which are hereby incorporated by reference.

STATEMENT REGARDING FEDERALLY SPONSORED RESEARCH

Not Applicable

FIELD OF THE INVENTION

The present invention relates to an artificial bait which uses a magnet to move a portion or portions of the artificial bait.

DESCRIPTION OF THE PRIOR ART

There are many lures and jigs that adequately emulate a bait fish or bug under the water. But surface or floating lures have and issue in that only way to get a motion to them is to pull or jig the line. This not only leaves an unnatural ripple across the surface of the water from line, but also make the lure make rapid movement forward. This motion does not at all emulate a bug struggling in the water.

Currently lures are either motionless or are a minnow that have a wiggling tail. There are no lures on the market that emulate the motions of a bug struggling on the surface of the water. There are also none that emulate the motions of a worm, frog, snake or other thing not a minnow or bait fish.

SUMMARY OF THE INVENTION

The present invention provides a number of combined features over prior art bug lures. First, the present invention can be wirelessly or wired charged depending on the design, which provides greater flexibility in terms of how the bug lure is powered. Second, the present invention includes a controller that can be programmed/reprogrammed to adjust the performance and behavior of the bug lure. This allows the bug lure to be customized to the specific needs of the user. It is possible to also use the antenna and communication circuitry for the present invention for a location tracking system that allows the user to track the location of the bug lure, this could be a LoRa network or other long range low power communication or tracking networks such as GPS.

The present invention relates to a bug shaped lure that can be wirelessly or wired charged depending on the design. The bug lure includes a body, a voice coil motor, and a controller, it can also include an antenna as part of the controller or separately for wireless communication and charging. The body is configured to resemble a real insect. The motor is configured to move the body in a manner that resembles the movement of a real insect in distress. The controller is configured to control the operation of the motor.

One option will have the bug lure can be wirelessly charged by placing it in close proximity to a wireless charging source. The bug lure can also be wired charged by connecting it to a power source using a wired charging cable.

One embodiment of the invention is an artificial bait which includes a housing, a power source arranged in the housing, an electric motor arranged in said housing, a controller arranged in the housing, a coil electrically connected to the electric motor, a magnet placed near the coil, which is physically attached to a movable portion of the housing and a hook. The controller alternates a current produced by the electric motor to cause the movable portion of the housing to move back and forth.

The artificial bait can have its power source charged either by wire or wirelessly. The housing can include a charging point for wireless charging with the wireless charging source being a Qi charger, a WPC charger, or a PMA charger.

The artificial bait controller can be programmed either with a wired connection or wirelessly to adjust the performance and behavior of the artificial bait. The programming can adjust the speed of the motor, the movement pattern of the movable portion of the housing, or the sound/frequency emitted by the movable portion of the housing interacting with an environment, such as air or water.

The artificial bait housing can be in the shape of an animal or insect. The insect can be a fly, mayfly, mealworm, cricket, damsels, dragonfly, black soldier fly, stolidly, giant water bug, lethocerus, caddis fly, domestic silk moth, mantis, grasshopper, diving beetle, or cicada. The animal can be a fish, a worm, a frog or a snake.

The artificial bait can include a location tracking device, such as a LoRa device, a GPS receiver, a Bluetooth beacon, and an RFID tag.

The artificial bait can include an antenna to enable wireless communication between the artificial bait and a user. The antenna can be a separate component of the bait or the coil can also function as an antenna used for wireless communication.

The artificial bait can include an accelerometer configured and arranged to distinguish between a fish strike and a weed impact and wirelessly communicate this information to a user.

The artificial bait can include a force gauge connected to the hook to determine the weight of a fish hooked by the artificial bait.

The artificial bait can have multiple sections, each with its own coil and magnet, the sections can be controlled separately by the controller, to move together or separately, to mimic the movements of an insect or animal.

The artificial bait can have its moveable portion connected to the housing via a spring, which will cause the moveable portion to oscillate.

The artificial bait can also have a plurality of coils and magnets, such as four coils and four magnets, each connected to a paddle via pivot points and a pivot beam, each of the four paddles being caused to move up and down, either together or separately, by the controller.

These together with other objects of the invention, along with the various features of novelty which characterize the invention, are pointed out with particularity in the claims annexed to and forming a part of this disclosure. For a better understanding of the invention, its operating advantages and the specific objects attained by is uses, reference should be made to the accompanying drawings and descriptive matter in which there are illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawing wherein.

DETAILED DESCRIPTION OF THE INVENTION

Figure 1:
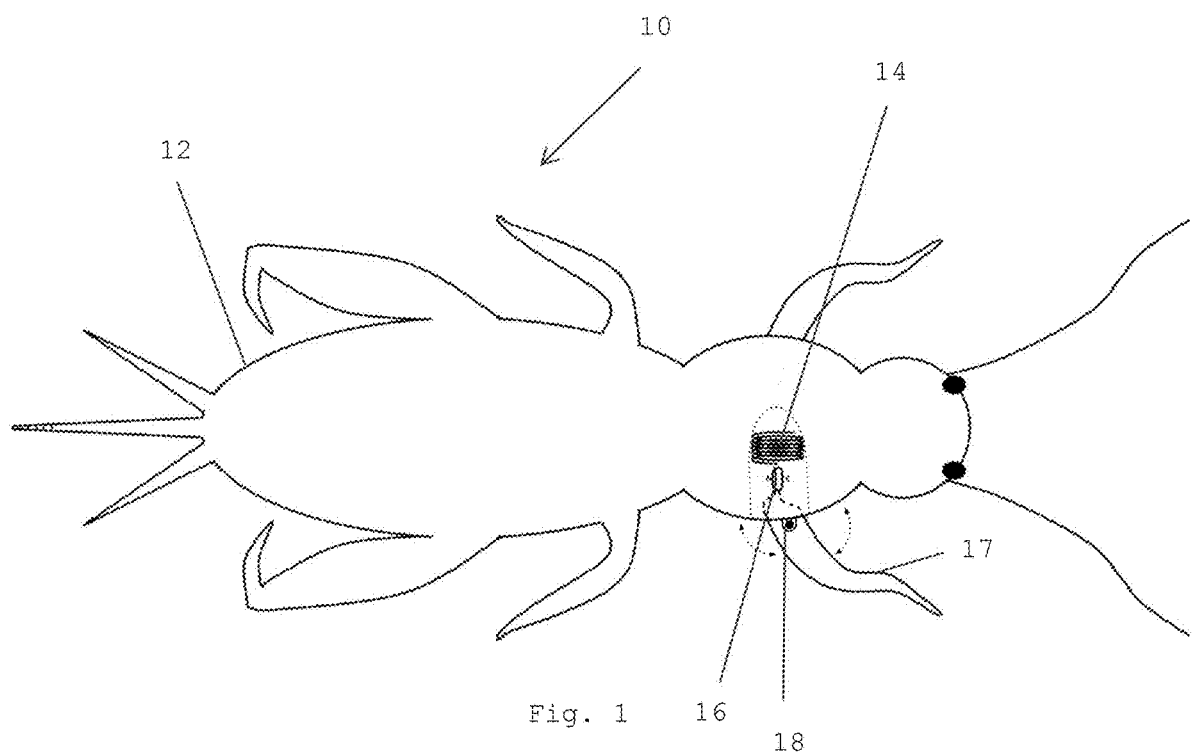
FIG. 1 is a top view of a cricket embodiment of the invention.

With reference now to the drawing, and in particular to FIGS. 1 through 12 thereof, an artificial bait using a voice coil and magnet to create movement in the bait, embodying the principles and concepts of the present invention will be described.

Referring now to FIG. 1, a top view of a cricket embodiment of the invention is shown generally at 10. A cricket shaped housing is shown at 12, with a voice coil 14 and a magnet 16 being connected to a movable cricket leg 17, which is mounted to the housing at pivot point 18. The arrows show that the leg move back and forth when alternating current is run through the voice coil.

Figure 13:
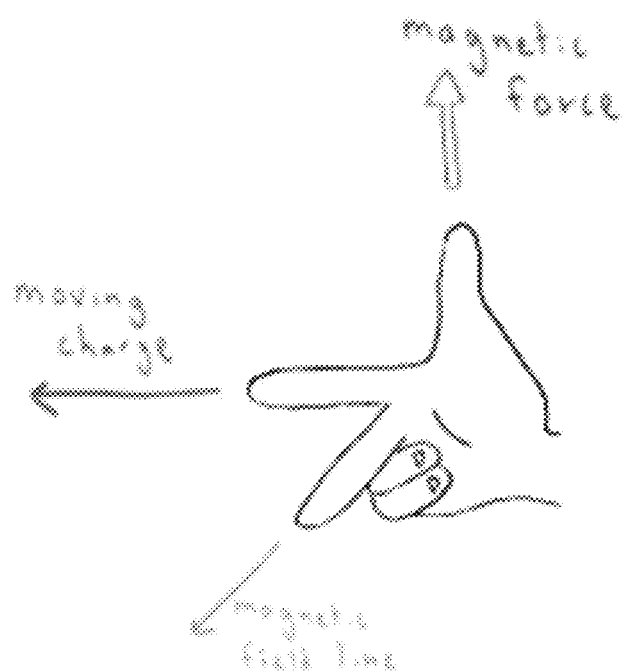
FIG. 13 is a diagram showing the three-finger rule, which is a mnemonic used to determine the direction of forces, magnetic fields, and currents in electromagnetism.

As is well known in the art, a magnet force is created by moving current through a wire. FIG. 13 shows a thumb and two fingers, all three of which are orthogonal to each other. The index finger represents the moving current, the middle finger shows the magnet field lines and the magnetic force direction is shown by the thumb. If the current direction is reversed, the magnetic force is opposite to the direction shown (pointing straight down). The alternating current in the coil 14 creates a pivot movement in the magnet 16 which pulls on the sides of the leg 17, causing the leg to move back and forth.

Figure 2:
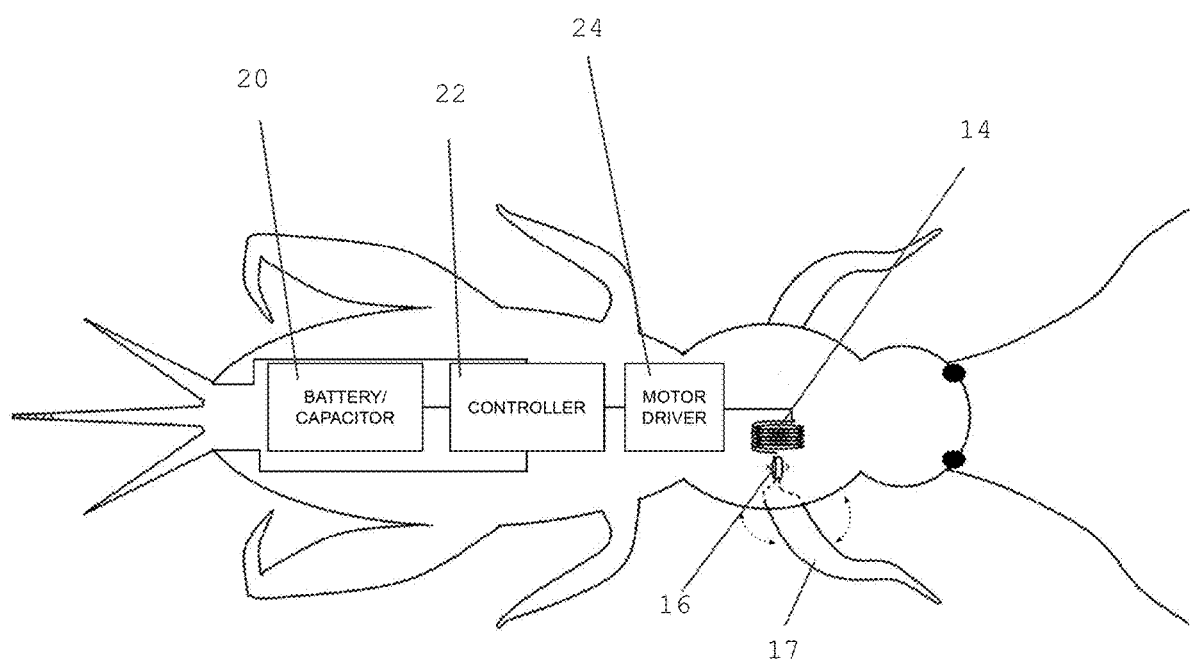
FIG. 2 shows FIG. 1 in more detail.

FIG. 2 shows FIG. 1 in more detail, with a battery or capacitor 20 to provide power to a controller 22 and motor driver 24, which are electrically connected to the voice coil 14.

Figure 3:
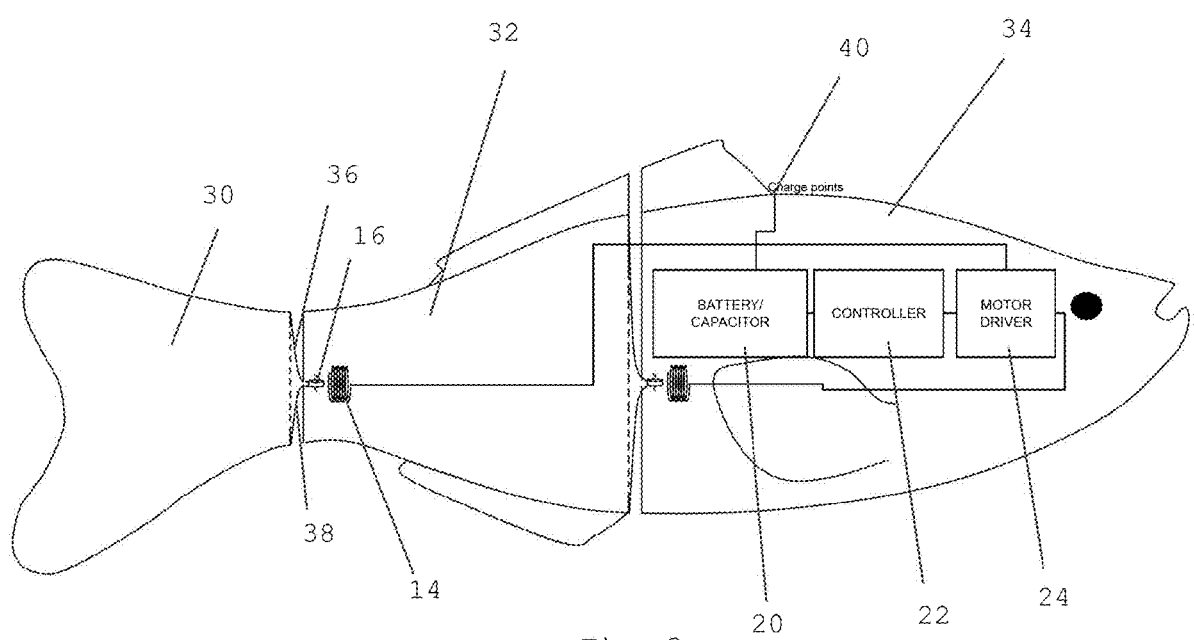
FIG. 3 is a side view of a bait fish embodiment of the invention.

FIG. 3 is a side view of a bait fish embodiment of the invention, with a three segment housing shown at 30, 32 and 34. The tail segment 30 is connected to the middle segment 32 via wires 36 and 38, which are connected to magnet 16 which is magnetically coupled with voice coil 14. The middle section is similarly connected to the front section 34. Both coils 14 are electrically connected to the controller and motor driver 22 and 24, which are powered by battery/capacitor 20. The battery/capacitor 20 can be charged via a wired connection or wirelessly using a charging point 40. The wireless charging source can be a Qi charger, a WPC charger, or a PMA charger.

Figure 4:
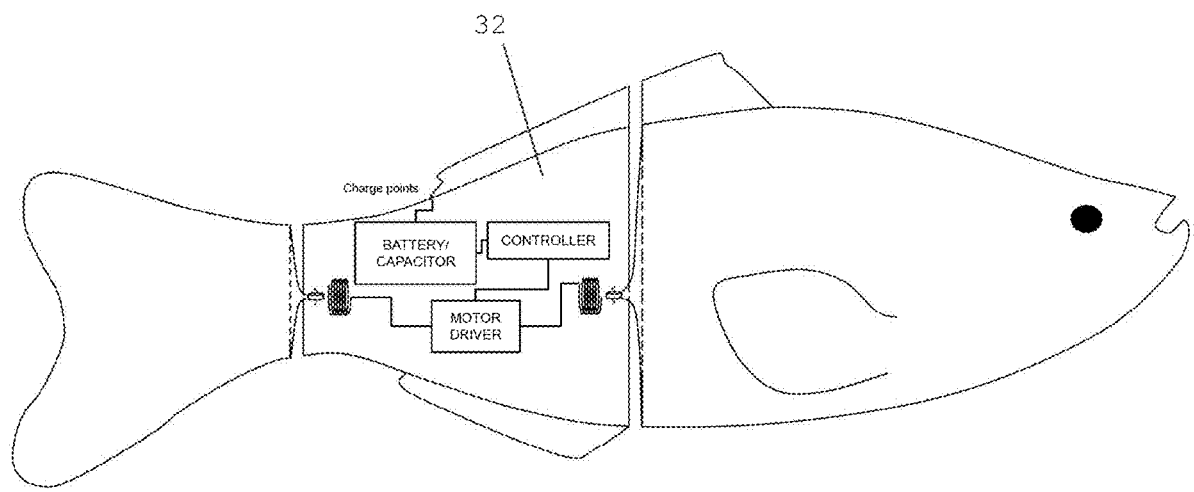
FIG. 4 is a side view of an alternative arrangement of the invention of FIG. 4.

FIG. 4 is a side view of an alternative arrangement of the invention of FIG. 4, with the electronics in the middle section 32, instead of the front section 34.

Figure 5:
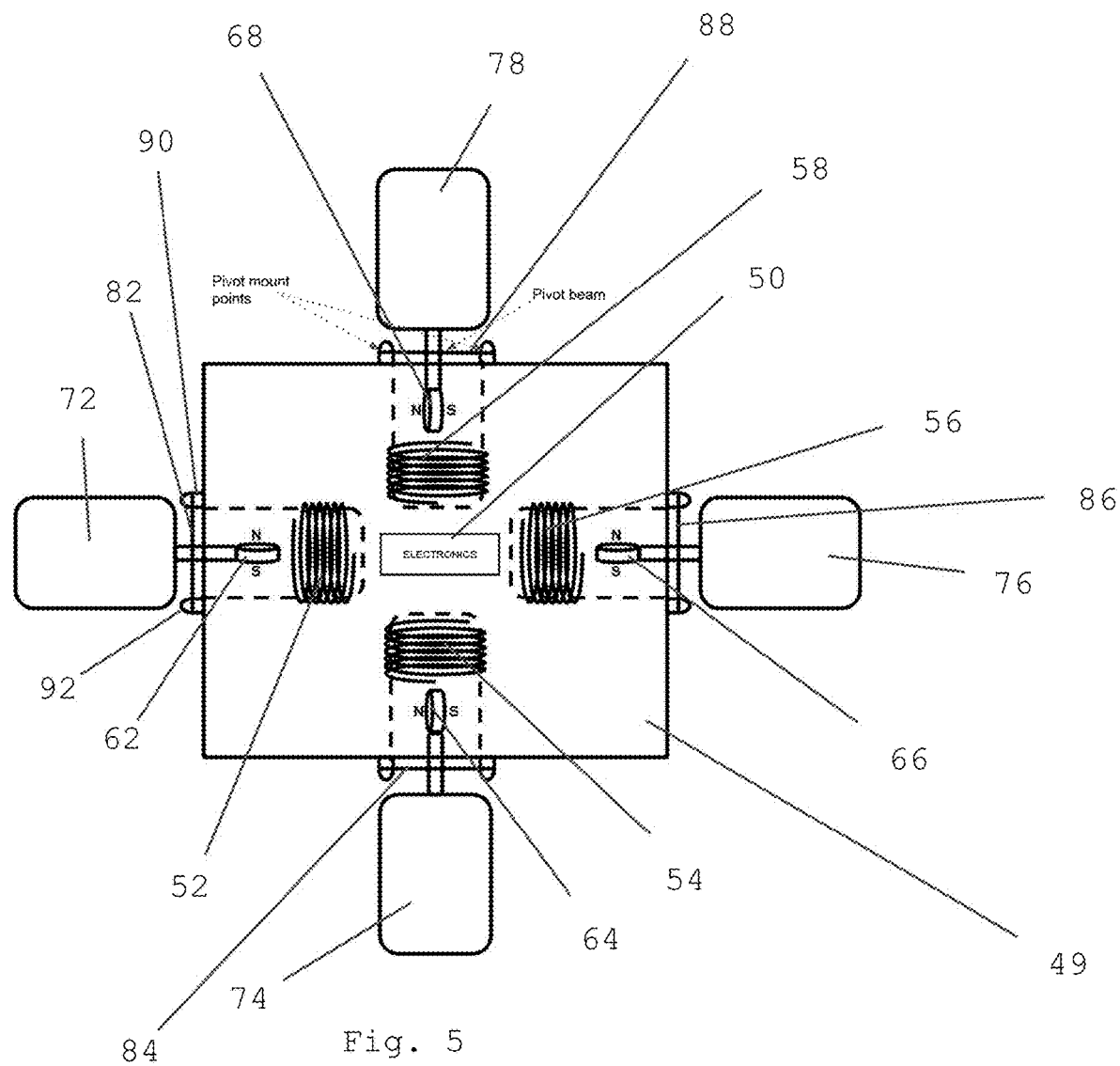
FIG. 5 is a top view of a schematic of a four coil and four magnet version of the invention.

FIG. 5 is a top view of a schematic of a four coil and four magnet version of the invention. The schematic box and paddles are for a generic lure with generic armatures respectively. The box 49 could be shaped like a fish, crawfish, cicada etc. While the paddles could be shaped as arms, wings, antenna etc. The electronics (a battery/capacitor a controller and motor) are shown at 50 and are electrically connected to the four voice coils 52, 54, 56 and 58, which are magnetically coupled with magnets 62, 64, 66 and 68 (which should actually be shown parallel to the surface of the housing (as a circle). Each magnet is connected to a paddle 72, 74, 76 and 78. The paddles move up and down as the current alternates in the coils, bouncing off the pivot beams 82, 84, 86 and 88, which are connected to the box 49 with pivot mount points 90 and 92 (only shown for one paddle).

Figure 6:
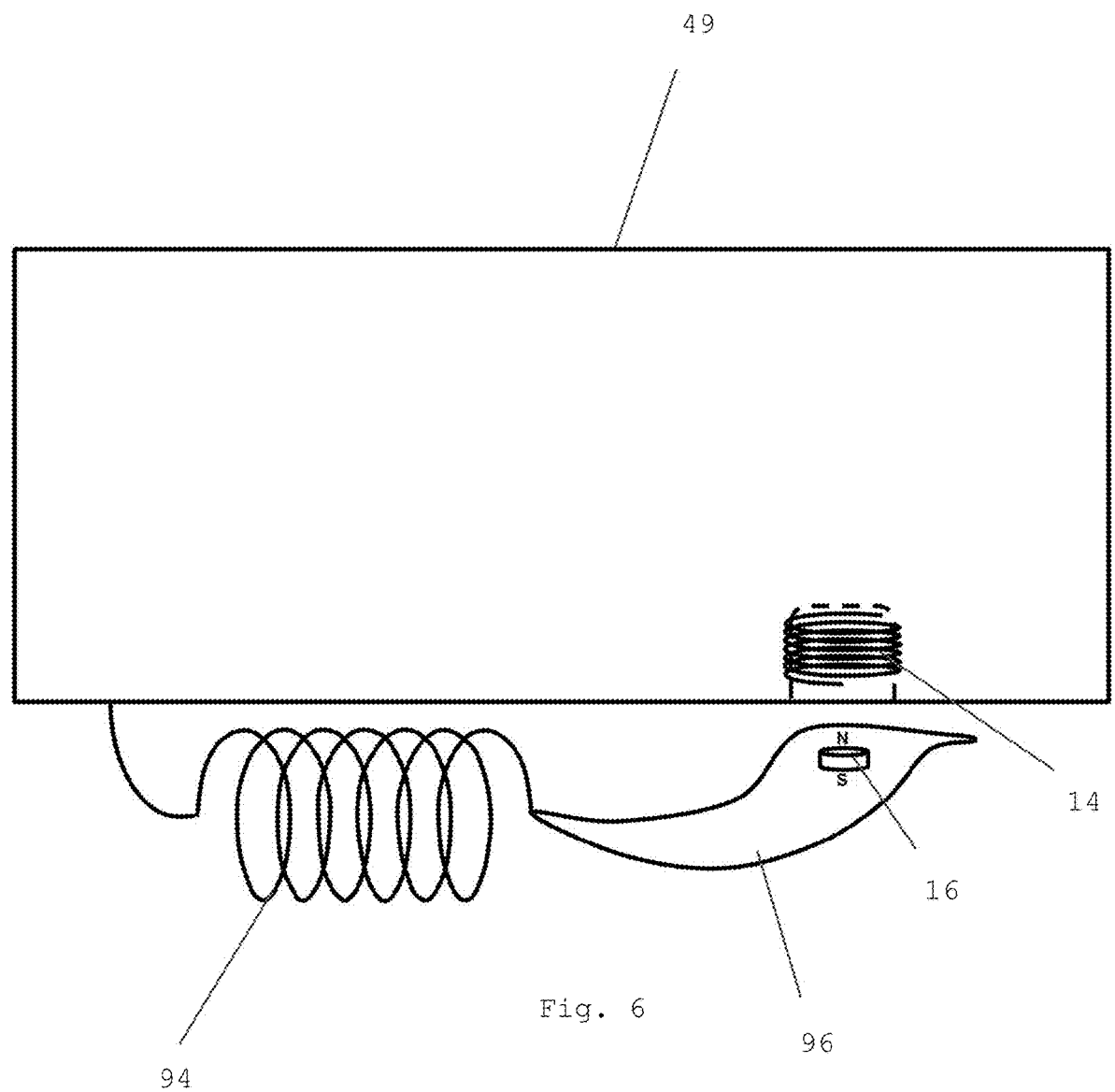
FIG. 6 is a schematic view of a spring version of the invention.

FIG. 6 is a schematic view of a spring version of the invention with a box 49 connected to a spring 94, which is connected to a generic appendage 96. A magnet 16 is carried in the generic appendage 96 and is magnetically coupled to a voice coil 14 to move the appendage 96 as current alternates in the coil 14. The spring 94 stores energy and then the magnet 16 actuates the spring 94 which then causes the spring to resonate. The spring is shown as a coil spring but could be a bimetallic, leaf or any other kind of spring. In the coil 14 there is an alternating current which when applied will either attract or repel the permanent magnet 14, moving the generic appendage 96.

Figure 7:
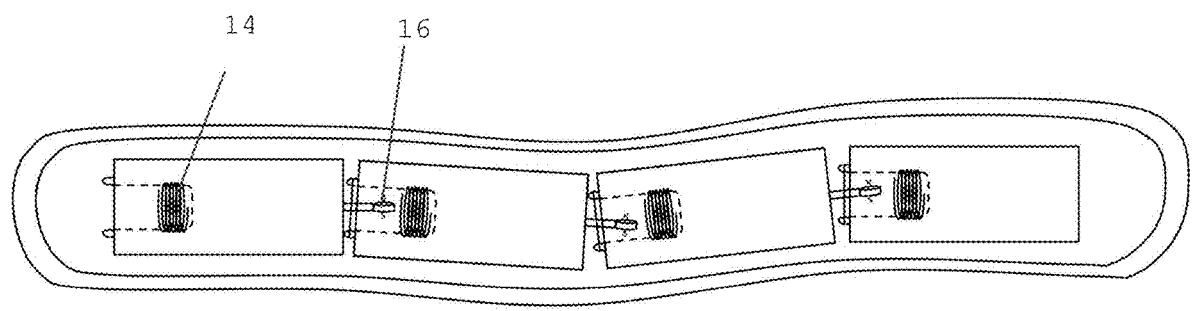
FIG. 7 is a top view of a worm version of the invention with four segments.

FIG. 7 is a top view of a worm version of the invention with four segments, each having a coil 14, with each segment connected to each other via a magnet 16 so that alternating current in the coils 14 cause the worm bait to move like a worm.

Figure 8:
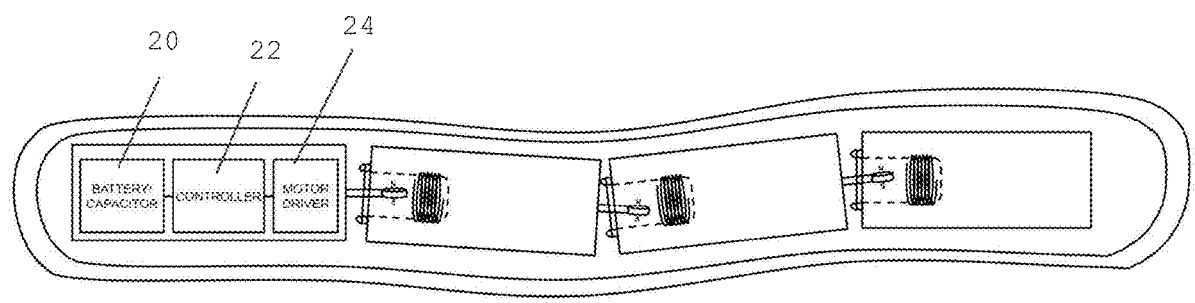
FIG. 8 shows a different embodiment of a worm bait.

FIG. 8 shows a different embodiment of a worm bait with one segment containing the electronics (battery/capacitor 20, controller 22 and motor driver 24).

Figure 9:
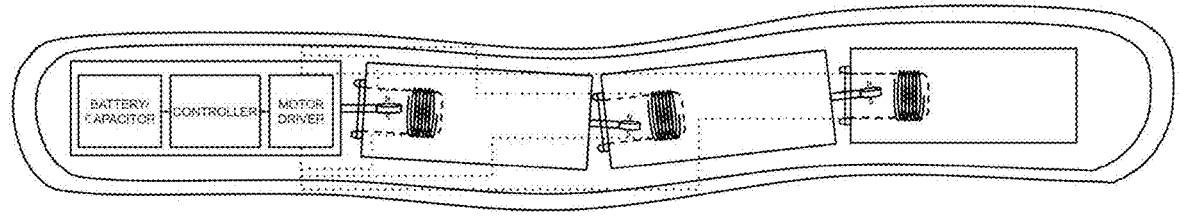
FIG. 9 uses dotted lines to show how the controller and motor is electrically connected to the three segments.

FIG. 9 uses dotted lines to show how the controller and motor is electrically connected to the three segments.

FIG. 9 is a top view of a frog embodiment of the invention.

Figure 10:
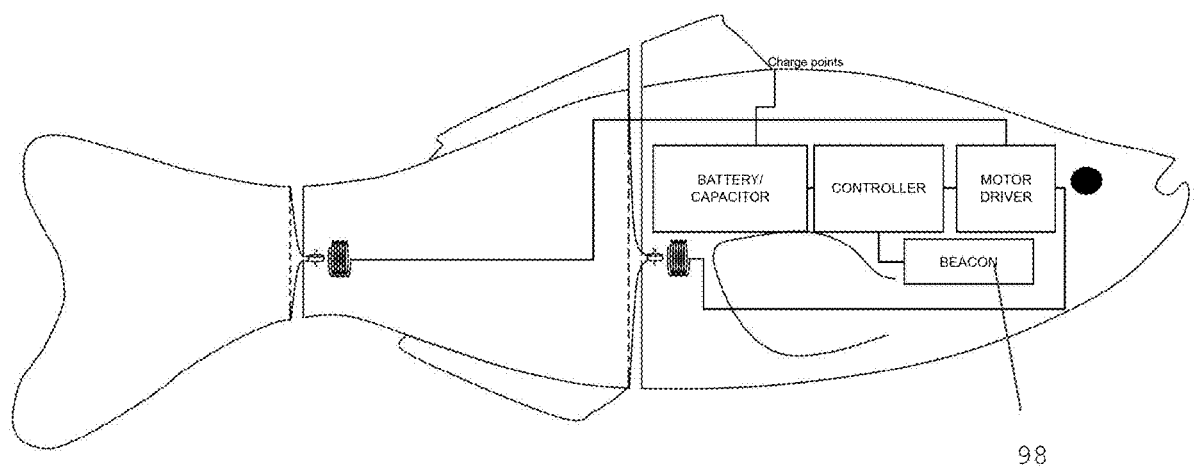
FIG. 10 is a side view of a bait fish embodiment of the invention with a location beacon.

FIG. 10 is a side view of a bait fish embodiment of the invention with an location beacon 98.

Figure 11:
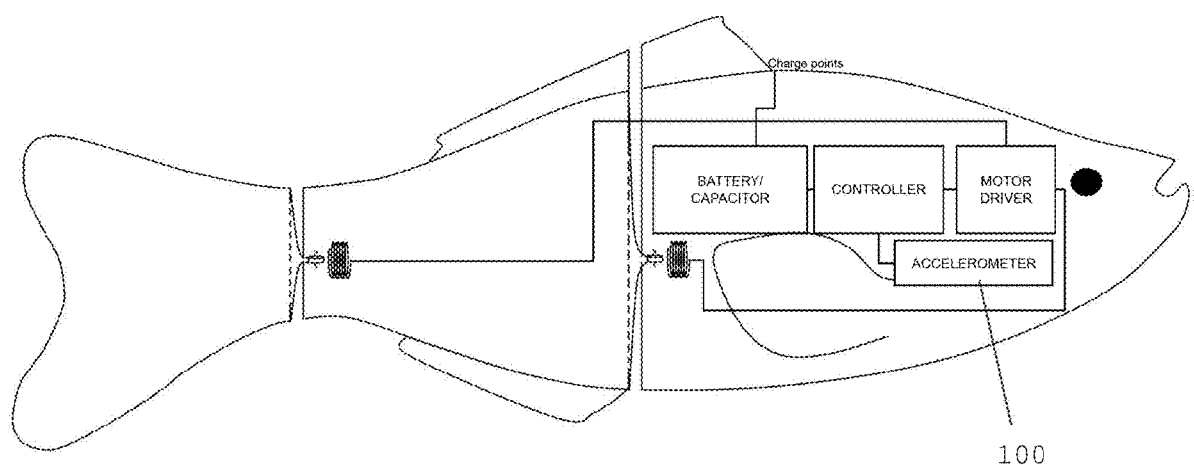
FIG. 11 is a side view of a bait fish embodiment of the invention with an accelerometer.

FIG. 11 is a side view of a bait fish embodiment of the invention with an accelerometer 100.

Figure 12:
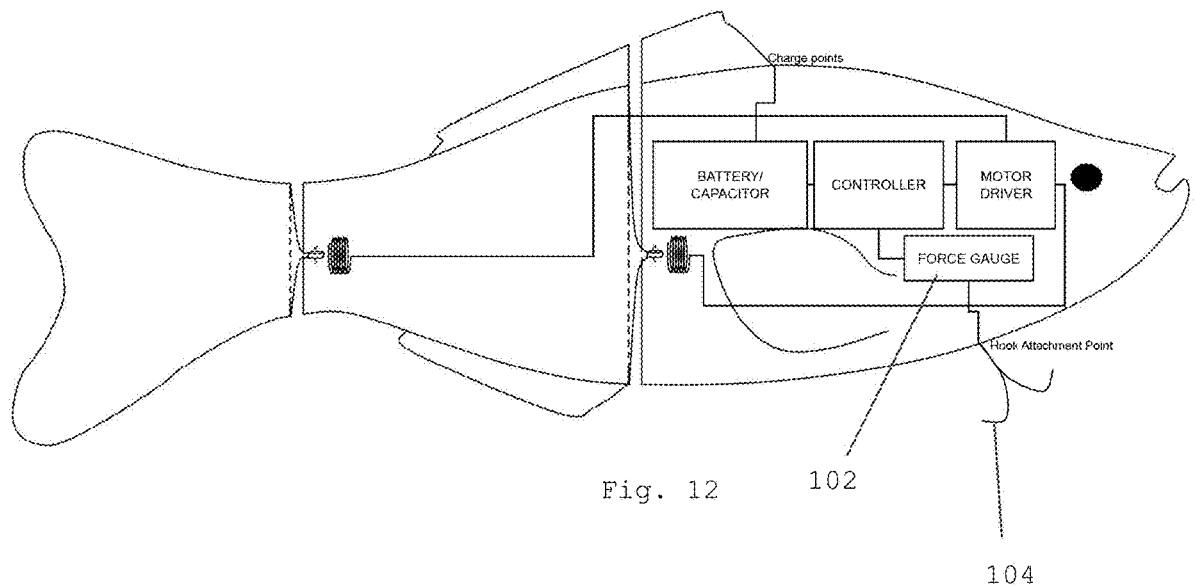
FIG. 12 is a side view of a bait fish embodiment with a force gauge physically connected to the hook, to allow for weighing a fish.

FIG. 12 is a side view of a bait fish embodiment with a force gauge 102 physically connected to the hook 104, to allow for weighing a fish.

The bug lure of the present invention includes a body, a motor, and a controller. The body is configured to resemble a real insect. Examples of such insects are: Fly, Mayfly, Mealworm, Cricket, Damsels, Dragonfly, Black soldier fly, Stoney, Giant water bug, Lethocerus, Caddis fly, Domestic silk moth, Mantis. Grasshopper, Diving beetle, Cicada. The motor is configured to move the body in a manner that resembles the movement of the real insect that the lure resembles. The controller is configured to control the operation of the motor.

The body of the bug lure can be made from a variety of material combinations, such as plastic and rubber, epoxy and styrofoam beads, foam and plastic, or wood. The mixture of materials and components is balanced to maintain the right level of buoyancy. A simple calculation would be maintaining the ratio of the materials based on their densities, such that the overall density of the device matches that of the desired depth of water the lure is desired to float in. The mixtures can vary throughout the lure, to compensate for different weights of the electronic components, fixtures, line, etc. Certain outer surfaces of the lure can also contain a mix of outer layers, eg. a protective sheath made of a tough wire mesh to prevent the electronics being damaged during bite events, or even a soft outer coating to better improve grip, feel and mimic more fluid motions for the lure.

The bug lure can be multi jointed either for different appendages and wings of the lure or for a more soft bodied lure, eg. a worm can be multiple links for the device. These multiple links could have a single set of electronics and power storage for all of them or individual ones incorporated in each segment.

The motor of the bug lure can be a variety of types, such as a VCM (voice coil motor), a stepper motor, or a brushed/brushless motor. The motion actuator could also be an electromagnet attracting/repelling a permanent magnet that is attached to a spring in the joint. The spring along with the rest of the components are designed to resonate in conditions that the lure would be in at a frequency similar to that of the real insect it resembles or another desired frequency.

The controller of the bug lure can be a variety of types, such as a microcontroller, a microprocessor, or a DSP. These devices can be embedded in the above body material, or in a cavity.

The bug lure can be wirelessly charged by placing it in close proximity to a wireless charging source. The wireless charging source can be a Qi charger, a WPC charger, or a PMA charger. The antenna for the wireless charging could be the same coil as the motor or a separate coil/antenna. The bug lure can also be wired charged by connecting it to a power source using a wired charging cable.

The controller of the bug lure can be programmed to adjust the performance of the bug lure. For example, the controller can be programmed to adjust the speed of the motor, the movement pattern of the body, or the sound/frequency emitted by the bug lure.

The bug lure can also include a location tracking system. The location tracking system can be a LoRa device, GPS receiver, a Bluetooth beacon, or an RFID tag. The location tracking system allows the user to track the location of the bug lure. This is useful for applications where the bug lure is used to attract fish to the lure and understand more about the location of the fish.

The present invention provides a number of advantages over prior art bug lures. First, the present invention can be wirelessly or wired charged, which provides greater flexibility in terms of how the bug lure is powered. Second, the present invention includes a controller that can be programmed to adjust the performance of the bug lure. This allows the bug lure to be customized to the specific needs of the user. Third, the present invention includes a location tracking system that allows the user to track the location of the bug lure. This is useful for applications where the bug lure is used to attract insects to a specific location.

Therefore, the foregoing is considered as illustrative only of the principles of the apparatus of a shape memory artificial bait. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An artificial bait comprising:
   a housing;
   a power source arranged in the housing;
   an electric motor arranged in said housing;
   a controller arranged in the housing;
   a coil electrically connected to the electric motor;
   a magnet placed near the coil, which is physically attached to a movable portion of the housing;
   a hook, and
   wherein the controller alternates a current produced by the electric motor to cause the movable portion of the housing to move back and forth.

2. The artificial bait of claim 1 wherein the power source can be charged.

3. The artificial bait of claim 2 wherein the power source can be charged by a wired connection to the power source.

4. The artificial bait of claim 2 wherein the housing includes a charging point for wirelessly charging the power source.

5. The artificial bait of claim 4 wherein the wireless charging source is selected from the group consisting of a Qi charger, a WPC charger, and a PMA charger.

6. The artificial bait of claim 1 wherein the controller can be programmed either with a wired connection or wirelessly to adjust the performance and behavior of the artificial bait.

7. The artificial bait of claim 6 wherein the controller can be programmed to adjust the performance of the artificial bait.

8. The artificial bait of claim 7 wherein the programming is selected from the group consisting of adjusting the speed of the motor, the movement pattern of the movable portion of the housing, and the sound/frequency emitted by the movable portion of the housing interacting with an environment, such as air or water.

9. The artificial bait of claim 1 wherein the housing is in the shape of an animal or insect.

10. The artificial bait of claim 9 wherein the insect is selected from the group consisting of fly, mayfly, mealworm, cricket, damsels, dragonfly, black soldier fly, stonefly, giant water bug, lethocerus, caddis fly, domestic silk moth, mantis, grasshopper, diving beetle, and cicada.

11. The artificial bait of claim 9 wherein the animal is selected from the group consisting of fish and worm.

12. The artificial bait of claim 1 further including a location tracking device.

13. The artificial bait of claim 12 wherein the location tracking device is selected from the group consisting of a LoRa device, a GPS receiver, a Bluetooth beacon, and an RFID tag.

14. The artificial bait of claim 1 further including an antenna to enable wireless communication between the artificial bait and a user.

15. The artificial bait of claim 14 wherein the antenna is the coil.

16. The artificial bait of claim 1 further including an accelerometer configured and arranged to distinguish between a fish strike and a weed impact and wirelessly communicate this information to a user.

17. The artificial bait of claim 1 further including a force gauge connected to the hook to determine the weight of a fish hooked by the artificial bait.

18. An artificial bait comprising:
    a housing;
    a power source arranged in the housing;

an electric motor arranged in said housing;
a controller arranged in the housing;
a coil electrically connected to the electric motor;
the housing having a plurality of sections, each section having a magnet placed near a coil, each coil being electrically connected to the electric motor;
a hook, and
wherein the controller alternates a current produced by the electric motor to cause the housing sections to move back and forth.

19. The artificial bait of claim 18 wherein the housing sections can be moved together or separately from each other.

20. An artificial bait comprising:
a housing;
a power source arranged in the housing;
an electric motor arranged in said housing;
a controller arranged in the housing;
a coil electrically connected to the electric motor;
a magnet placed near the coil, which is physically attached to a movable portion of the housing using a spring;
a hook, and
wherein the controller alternates a current produced by the electric motor to cause the movable portion of the housing to move back and forth.

21. An artificial bait comprising:
a housing;
a power source arranged in the housing;
an electric motor arranged in said housing;
a controller arranged in the housing;
four coils, each electrically connected to the electric motor;
four magnets, each magnet placed near one of the four coils, each magnet being physically attached to a movable portion of the housing;
a hook, and
wherein the controller alternates a current produced by the electric motor to cause the movable portions of the housing to move back and forth.

* * * * *